(12) United States Patent
Nagano

(10) Patent No.: US 6,873,895 B2
(45) Date of Patent: Mar. 29, 2005

(54) METHOD OF CONTROLLING 4-WHEEL DRIVE VEHICLES

(75) Inventor: Yoshitaka Nagano, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/385,523

(22) Filed: Mar. 12, 2003

(65) Prior Publication Data

US 2004/0111206 A1 Jun. 10, 2004

(30) Foreign Application Priority Data

Mar. 14, 2002 (JP) ........................................ 2002-070168

(51) Int. Cl.$^7$ ............................................... G06F 7/00
(52) U.S. Cl. ........................................................ 701/69
(58) Field of Search .............................. 701/69, 70, 51; 477/34, 70, 79, 80, 84

(56) References Cited

U.S. PATENT DOCUMENTS 6,132,332 A * 10/2000 Yasui .......................... 477/36

FOREIGN PATENT DOCUMENTS

| JP | 8-175206 | 7/1996 |
| JP | 11-201195 | 7/1999 |

* cited by examiner

Primary Examiner—Yonel Beaulieu
(74) Attorney, Agent, or Firm—Wenderoth, Lind & Ponack, L.L.P.

(57) ABSTRACT

A method of controlling a four-wheel drive vehicle permits reverse travel on a low-$\mu$ road without engaging shock. In a four-wheel drive vehicle in which two-wheel drive and four-wheel drive can be changed over by means of a rotation transmission device having a two-way clutch and an electromagnetic coil for controlling engagement of the two-way clutch, the traveling direction of the vehicle is detected with rotation sensors for detecting the rotational direction of the front and rear wheels. If the traveling direction of the vehicle is different from the traveling direction of the range, the two-way clutch is engaged.

9 Claims, 12 Drawing Sheets

Fig.2
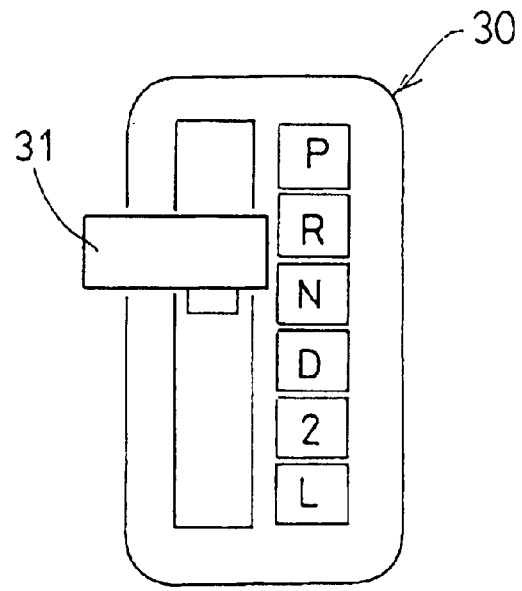
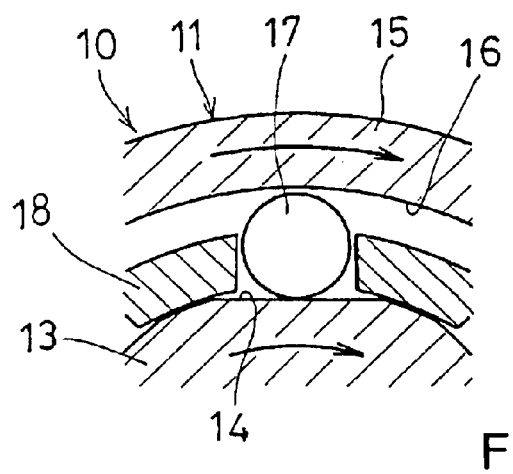
Fig.3A
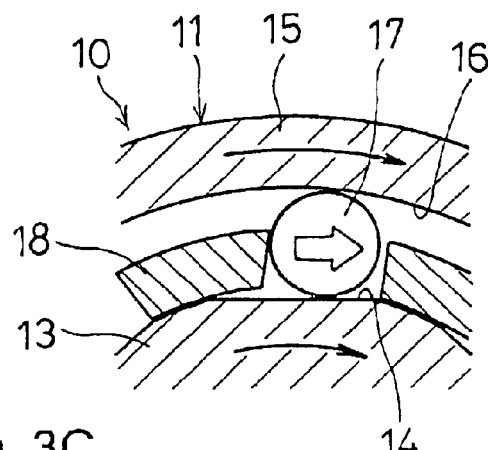
Fig.3B
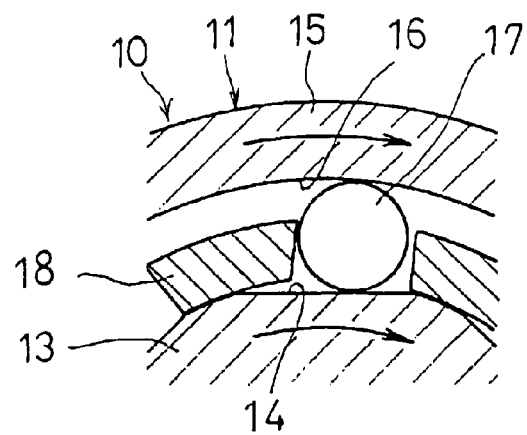
Fig.3C

METHOD OF CONTROLLING 4-WHEEL DRIVE VEHICLES

BACKGROUND OF THE INVENTION

This invention relates to a method of controlling FR-based four-wheel drive vehicles, more specifically a method of controlling four-wheel drive vehicles provided with a rotation transmission device on a power line for driving the rear wheels of the vehicle for carrying out changeover between transmission and shutoff of the driving force to the front wheels.

FIG. 11 shows an example of an FR-based four-wheel drive vehicle. With this four-wheel drive vehicle, power transmitted from an engine 1 to a transmission 2 is transmitted to a rear wheel propeller shaft 3 to drive the rear wheels 4. A rotation transmission device 10 is provided on the rear wheel drive line. The rotation transmission device 10 changes over between two-wheel drive and four-wheel drive. When the four-wheel drive is selected, the rotation of the rear wheel propeller shaft 3 is transmitted to a front wheel propeller shaft 5 to drive the front wheels 6.

The rotation transmission device 10 comprises, as shown in FIG. 12, a two-way clutch 11 and an electromagnetic coil 12 for controlling engagement of the two-way clutch 11. In the two-way clutch 11, cam surfaces 14 are formed on the outer periphery of an inner ring 13 coupled to the rear wheel propeller shaft 3. Engaging elements 17 comprising rollers are mounted between the cam surfaces 14 and a cylindrical inner surface 16 of an outer ring 15. An elastic force of a switch spring 19 is imparted to a retainer 18 for retaining the engaging elements 17 to retain the retainer 18 at an engagement-released position where the engaging elements 17 are not in engagement with the cam surfaces 14 and the cylindrical inner surface 16.

The electromagnetic coil 12 is arranged so as to axially oppose the retainer 18. Between the electromagnetic coil 12 and the retainer 18, a friction flange 20, prevented from rotating relative to the outer ring 15, and an armature 21 are mounted. The armature 21 is prevented from turning relative to the retainer 18 but is axially movable. When the electromagnetic coil 12 is energized, the armature 21 is attracted to the friction flange 20, so that due to the relative rotation between the retainer 18 and the inner ring 13, the engaging elements 17 will engage the cam surfaces 14 and the cylindrical inner surface 16, thereby transmitting the rotation of the inner ring 13 to the outer ring 15.

After deenergizing the electromagnetic coil 12, when the rotating speed of the outer ring 15 decreases below that of the inner ring 13, the engaging elements 17 will return to the engagement-released position by the elasticity of the switch spring 19.

Between the outer ring 15 of this rotation transmission device 10 and the front wheel propeller shaft 5 shown in FIG. 11, a transmission mechanism 7 such as a chain transmission is provided to transmit the rotation of the outer ring 15 to the front wheel propeller shaft 5.

Thus, by engaging the two-way clutch 11 by energizing the electromagnetic coil 12 of the rotation transmission device 10, the four-wheel drive vehicle shown in FIG. 11 can be changed over from two-wheel drive to four-wheel drive.

The four-wheel drive vehicle provided with this rotation transmission device 10 has a mode changeover lever operated by a vehicle driver. For control for automatically changing over between two-wheel drive and four-wheel drive according to the traveling state of the four-wheel drive vehicle with the AUTO mode selected by the mode changeover lever, as shown in FIG. 11, an arrangement is known in which the numbers of revolutions of the rear wheels 4 and the front wheels 6 are detected by ABS sensors S11 and S12 and the difference in their numbers of revolutions or change in the numbers of revolutions is used (JP patent publications 8-175206 and 11-201195).

In driving the four-wheel drive vehicle shown in FIG. 11, though it is a rare case, if reverse drive is selected in which a range in a direction opposite to the traveling direction is selected, for example, in an automatic transmission (AT) vehicle, by putting in the reverse range (R range) during travel in the drive range (D range), the front wheels 6 tend to rotate in the traveling direction due to inertia of the vehicle, while the rear wheels 4, which are the driving wheels, tend to rotate in a direction opposite to the direction in which the vehicle is traveling, namely, in the direction opposite to the front wheels 6.

In such a case, on a high-$\mu$ road, i.e. a road that is high in the friction coefficient ($\mu$) between the tires and the road surface, such as asphalt road, the engine may stop. But on a low-$\mu$ road, such as on a snow-covered or icy road, since the load on the rear wheels is much smaller than on a high-$\mu$ road, even if reverse drive is selected while traveling at several tens of kilometers per hour, the rear wheels 4 will rotate in a reverse direction without engine stop.

At this time, if the two-way clutch 11 of the rotation transmission device 10 is engaged, the front wheels 6, too, will rotate in the reverse direction together with the rear wheels 4, so that it is possible to keep traveling.

In a control in which two-wheel drive and four-wheel drive are automatically changed over from one to the other according to the travelling state of a four-wheel drive vehicle provided with the rotation transmission device 10, if the judgment of engagement as described above is carried out only with the difference between the numbers of revolutions of the front and rear wheels 4 and 6, or change in the numbers of revolutions detected by means of rotation sensors S13 and S14 for detecting the numbers of revolutions of the propeller shafts 3 and 5 of the front and rear wheels 4 and 6, or with ABS sensors S11 and S12 for detecting the numbers of revolutions of the front and rear wheels 4 and 6, a threshold has to be increased to distinguish from the number of revolutions or change in the rotation during normal travel. Thus, when the two-way clutch 11 is engaged by energizing the electromagnetic coil 12, the difference between the revolutions of the front and rear wheels 4 and 6 may be too large, so that engagement shock may occur when the engaging elements 17 engage the cam surfaces 14 and the cylindrical inner surface 16.

Such a problem may also occur with an FR-based four-wheel drive vehicle of a manual transmission (MT) vehicle provided with a rotation transmission device.

An object of this invention is to provide a method of controlling an FR-based four-wheel drive vehicle provided with a rotation transmission device having a two-way clutch and an electromagnetic coil for controlling engagement of the two-way clutch, which permits reverse travel without engagement shock on a low-$\mu$ road, which is free of error in judgment of reverse travel on a high-$\mu$ road, and which will not cause a tight corner braking.

SUMMARY OF THE INVENTION

According to the first invention, there is provided a method of controlling a four-wheel drive vehicle with an automatic transmission, the vehicle being provided with a rotation transmission device which permits selection between two-wheel drive and four-wheel drive by changing over transmission and shutoff of driving torque to front wheels. The rotation transmission device comprising a two-way clutch and an electromagnetic coil for controlling engagement of the two-way clutch, wherein if the traveling direction of the vehicle detected by means of rotation sensors for detecting the rotational direction of a propeller shaft for rear wheels or front wheels or that of the front and rear wheels is different from the traveling direction of the range, the vehicle is judged to be traveling in reverse and the electromagnetic coil is energized to engage the two-way clutch for four-wheel drive.

As described above, by detecting the traveling direction of the vehicle by means of rotation sensors for detecting the rotational direction of a propeller shaft for the rear wheels or front wheels or that of the front and rear wheels, and by engaging the two-way clutch if the traveling direction of the vehicle and the traveling direction of the range are different, it is possible to engage the two-way clutch at a stage in which the rotational speed difference between the front and rear wheels is small. This permits reverse travel on low-$\mu$ road without engaging shock.

In the method of controlling a four-wheel drive vehicle according to this invention, to conditions for judging reverse travel from the traveling direction of the vehicle and the traveling direction of the range, at least one of the following three conditions is added:

① if the rear wheels decelerate at a predetermined deceleration or more,

② if a time equal to or shorter than a preset time has passed after range has been changed over, and ③ if the degree of opening of the accelerator exceeds the value during idling, so that if conditions for judging reverse travel and the added condition are met, the two-way clutch is engaged.

The predetermined deceleration of the rear wheels is preferably from 5 rpm/0.01 sec to 20 rpm/0.01 sec.

According to the second invention, there is provided a method of controlling a four-wheel drive vehicle with an automatic transmission, the vehicle being provided with a rotation transmission device which permits selection between two-wheel drive and four-wheel drive by changing over transmission and shutoff of driving torque to front wheels. The rotation transmission device comprising a two-way clutch and an electromagnetic coil for controlling engagement of the two-way clutch, wherein if the range before changeover to N-range is different from the range after changeover to N-range and the vehicle speed in the N-range is not below a predetermined speed, the vehicle is judged to be traveling in reverse and the electromagnetic coil is energized to engage the two-way clutch for four-wheel drive.

According to the third invention, there is provided a method of controlling a four-wheel drive vehicle with an automatic transmission, the vehicle being provided with a rotation transmission device which permits selection between two-wheel drive and four-wheel drive by changing over transmission and shutoff of driving torque to front wheels. The rotation transmission device comprising a two-way clutch and an electromagnetic coil for controlling engagement of the two-way clutch, If the travelling direction of the range before changeover to N-range is the same as that of the range after changeover from N-range and the vehicle speed does not sink below a predetermined speed while the vehicle is travelling in N-range or if the vehicle speed when the range is changed over to N-range from other range is below a predetermined speed and the deceleration of the rear wheels have exceeded a predetermined value in several seconds after changeover from the N-range to other range, the vehicle is judged to be traveling in reverse and the electromagnetic coil is energized to engage the two-way clutch for four-wheel drive.

In either of the second and third inventions, as in the first invention, it is possible to engage the two-way clutch at a stage in which the rotational speed difference between the front and rear wheels is small.

According to the fourth invention, there is provided a method of controlling a four-wheel drive vehicle with a manual transmission, the vehicle being provided with a rotation transmission device which permits selection between two-wheel drive and four-wheel drive by changing over transmission and shutoff of driving torque to front wheels, the rotation transmission device comprising a two-way clutch and an electromagnetic coil for controlling engagement of the two-way clutch, wherein if the traveling direction of the vehicle detected by means of rotation sensors for detecting the rotational direction of a propeller shaft for rear wheels or front wheels or the rotational direction of the front and rear wheels is different from the driving direction of the vehicle, and if the degree of opening of the accelerator is above a value during idling, the vehicle is judged to be traveling in reverse and the electromagnetic coil is energized to engage the two-way clutch for four-wheel drive.

In the fourth invention too, reverse travel operation without engaging shock is possible on a low-$\mu$ road.

BRIEF DESCRIPTION OF THE DRAWINGS

Other features and objects of the present invention will become apparent from the following description made with reference to the accompanying drawings, in which:

FIG. 2 is a view showing the range display portion of an AT vehicle;

FIGS. 3A to 3C are sectional views showing how the two-way clutch is changed over to a four-wheel drive state;

DETAILED DESCRIPTION OF THE PREFERRED EMBODIMENT

Figure 1:
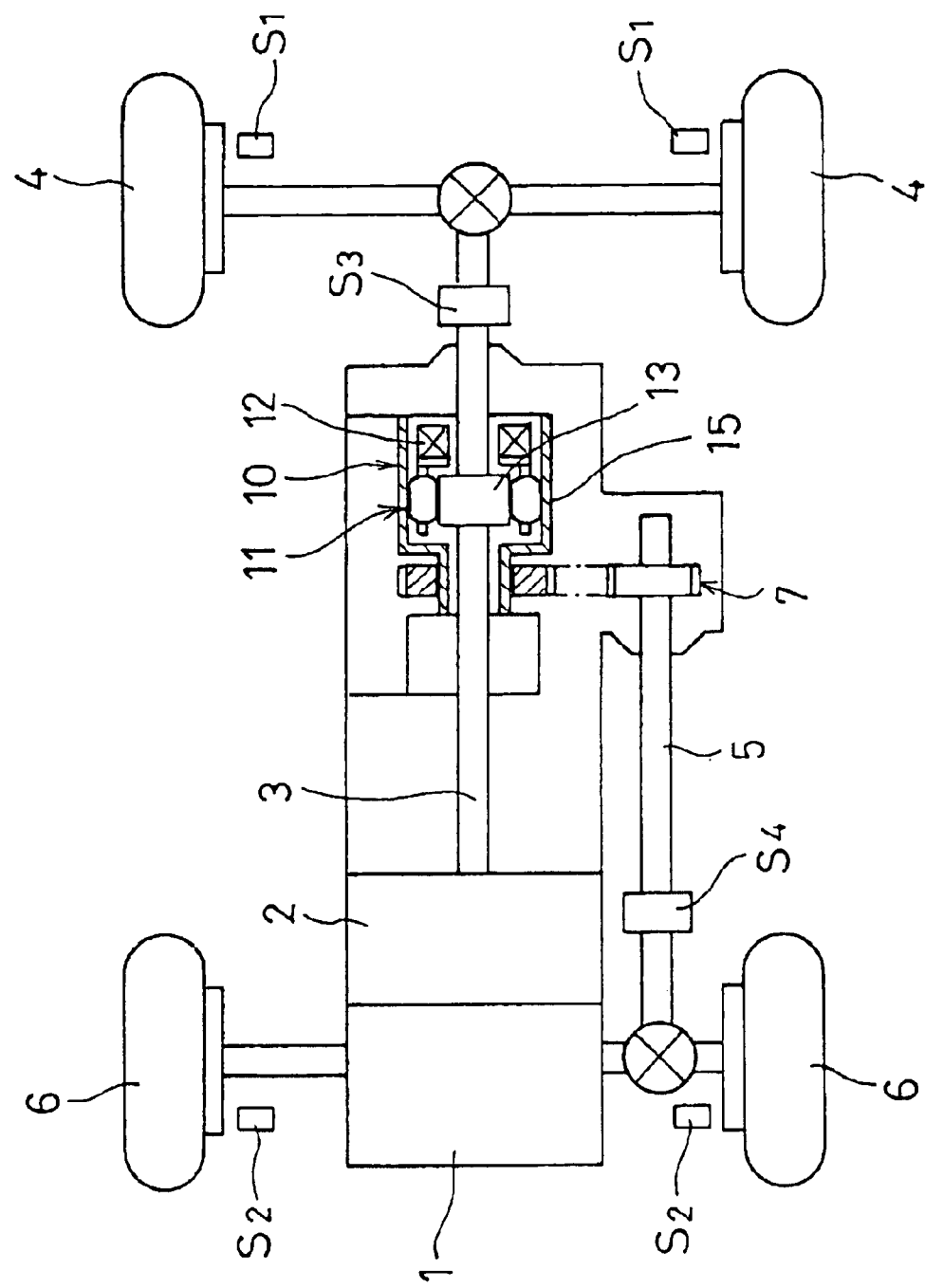
FIG. 1 is a schematic view of a four-wheel drive vehicle for which the control method of this invention is used.

Hereinbelow, the embodiments of this invention will be described with reference to the drawings. FIG. 1 shows an FR-based four-wheel vehicle with an automatic transmission (AT). It differs from the four-wheel drive vehicle of FIG. 11 only in that the rotation sensors S1 and S2 for ABS for detecting the numbers of revolutions of the rear wheels 4 and the front wheels 6 and the rotation sensors S3 and S4 for detecting the numbers of revolutions of the propeller shafts 3 and 5 for the front and rear wheels 4 and 6 are rotation sensors having rotation direction detecting function.

Figure 11:
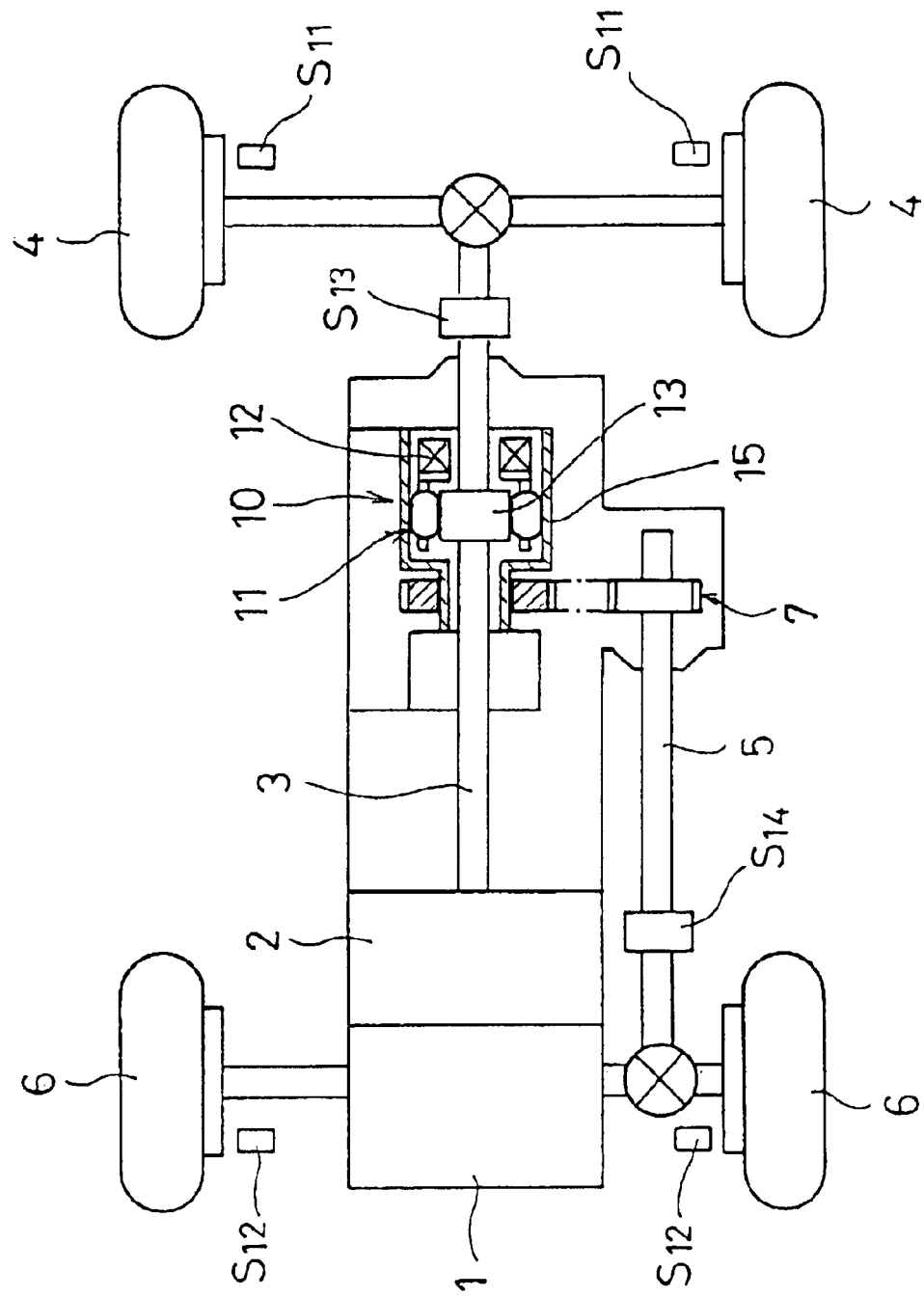
FIG. 11 is a schematic view of a conventional four-wheel drive vehicle of a AT type.
Figure 12A:
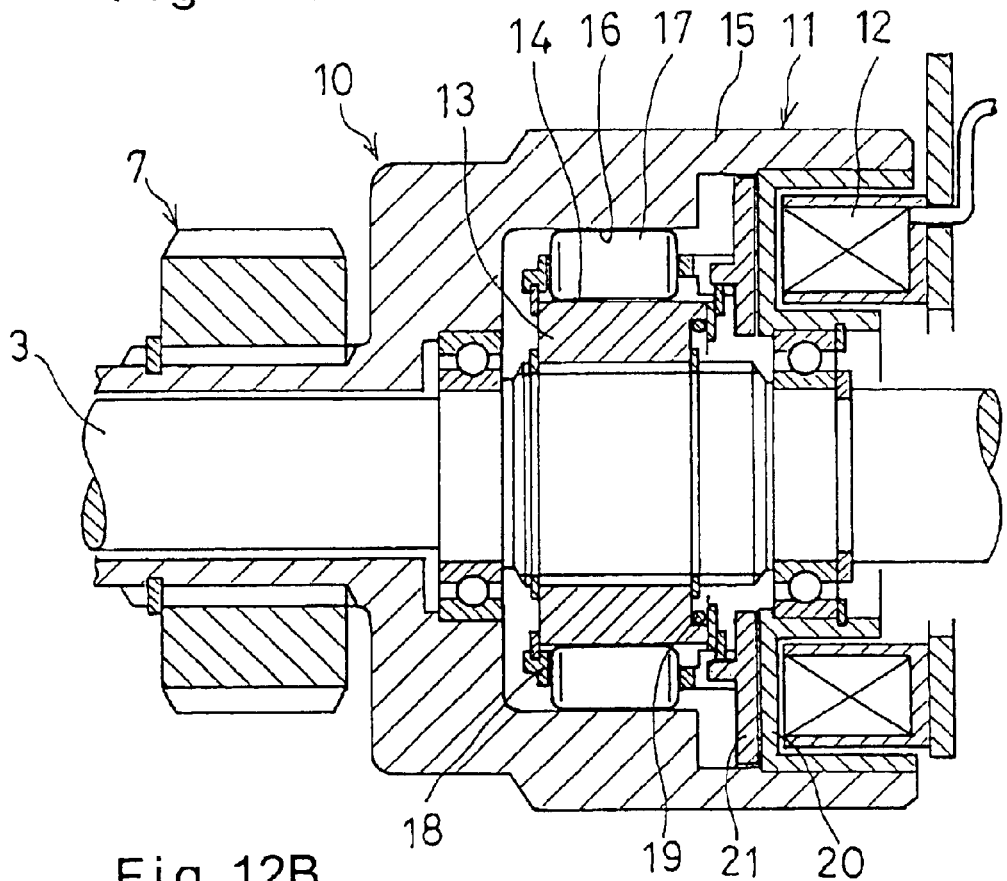
FIG. 12A is a vertical sectional front view of a rotation transmission device.
Figure 12B:
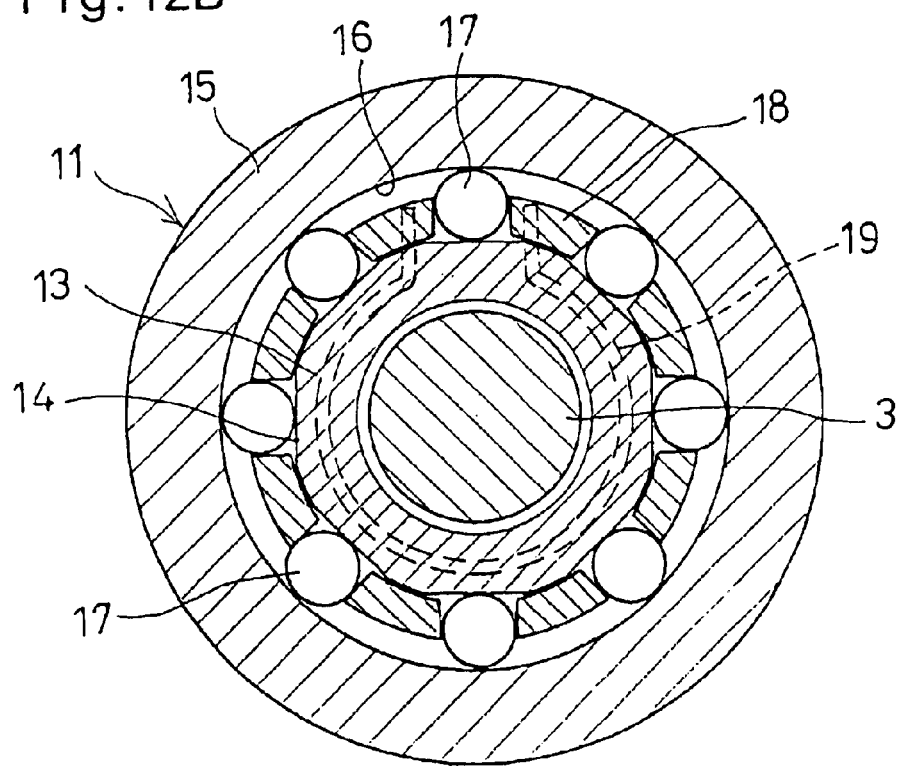
FIG. 12B is a vertical sectional side view thereof.
Figure 13:
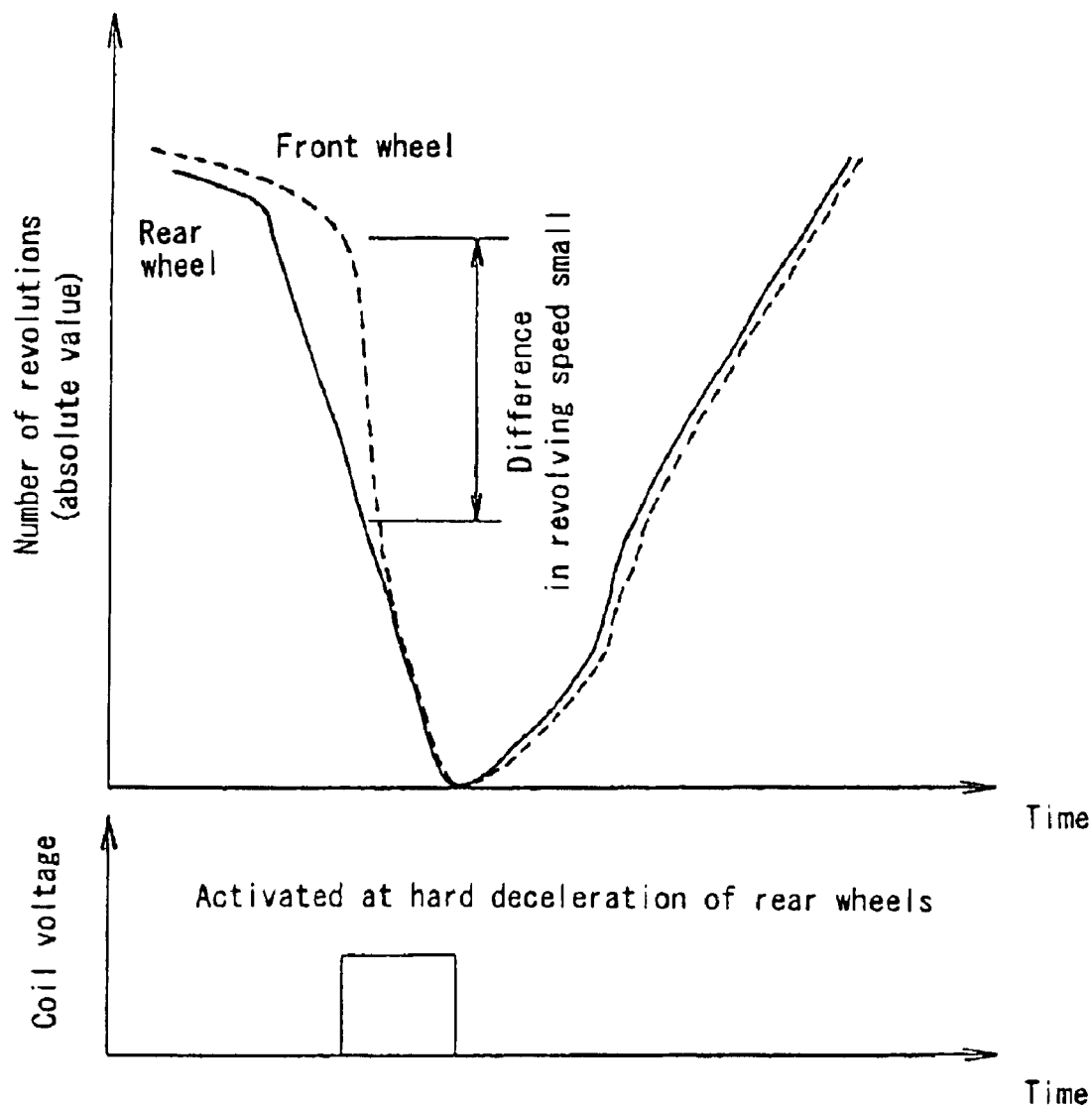
FIG. 13 is a graph showing the relation between the numbers of revolutions of the front and rear wheels and the coil voltage during reverse travel in a conventional method of judging reverse travel.

Thus, for the same parts as in the four-wheel drive vehicle shown in FIG. 11, the same numerals are used and their description is omitted.

FIG. 2 shows a range changeover display 30. By operating a range changeover lever 31, a range can be selected.

Generally, drive modes in an AT vehicle in which reverse travel is possible are the following two:

① During travel, the range is changed over to a range for driving in a reverse direction with respect to the direction in which the vehicle is traveling.

② While descending a slope under gravity acting the vehicle in a neutral (N) range, the range is changed over to a range for driving in a reverse direction with respect to the direction in which the vehicle is traveling.

During reverse travel on a low-$\mu$ road, since the load on the rear wheels 4 is small, no engine stop will occur. Since the rear wheels 4 as the driving wheels change the rotational direction, they will slip on the road surface and decelerate sharply, change the rotational direction and accelerate in the driving direction.

As for the front wheels 6 as the non-driving wheels, since the number of revolutions changes little, the difference in relative rotation between the front and rear wheels including the rotational direction increases with time.

If the two-way clutch 11 of the rotation transmission device 10 is engaged while the difference in rotation is large, engagement shock will be produced. In order to reduce such a shock, it is necessary to judge as early as possible that the vehicle is in a reverse travel state and engage the two-way clutch 11 of the rotation transmission device 10 before the difference in rotation between the front and rear wheels 4 and 6 increases too much.

Since reverse drive is an operation in which a reverse range with respect to the traveling direction of the vehicle is selected, e.g. changed over to a reverse (R) range while driving in a drive (D) range, it is necessary to detect the vehicle traveling direction and the range.

The traveling direction of the vehicle can be detected by detecting the rotational directions of the propeller shafts 3 and 5 for the front and rear wheels 4 and 6 by means of the rotation sensors S3 and S4 with rotational direction detecting function, or by detecting the rotational direction of the rear wheels 4 or front wheels 6 by means of the rotation sensors S1 and S2 with rotational direction detecting function.

As the ranges for judging reverse travel of the vehicle with respect to the traveling direction of the vehicle, there are P, R, N, D, 2 and L ranges as shown in FIG. 2. But since in the reverse travel judgement it is necessary to know only the traveling direction, at least the R, N and D ranges are necessary. Since it is not necessary to distinguish between the D range and 2 range and L range, once the D range is detected, the range is determined as the D range until the N range is detected. Thus, in view of the arrangement of the ranges, even if the 2 range or L range is selected, it is determined as the D range.

Hereinbelow, the method of determining if the vehicle is in reverse travel will be described with reference to specific examples.

Embodiment 1

A method of determining reverse travel when the rotational direction of the rear wheels 4 or front wheels 6 is detectable will be described below.

If a range in the reverse direction is selected with respect to the vehicle traveling direction detected by rotation sensors S1–S4 for detecting the rotating direction of the propeller shaft 3 or 5 for driving the rear wheels 4 or front wheels 6 and for detecting the rotational directions of the front and rear wheels 4 and 6, it is judged that reverse travel has been selected. As a result, the two-way clutch 11 is engaged by energizing the electromagnetic coil 12. In this judging method, if a range for driving the vehicle in the opposite direction to the vehicle traveling direction is selected, it is possible to instantaneously engage the two-way clutch 11. At such an engagement, since the difference in the numbers of revolutions between the inner ring 13 and the outer ring 15 is small, engagement shock seldom occurs.

Embodiment 2

In Embodiment 1, if, for example, a driver of the vehicle should change over by mistake to the R range during forward turning on a high-$\mu$ road and try to continue travel by returning to the D range before engine stop occurs, a tight corner braking phenomenon will occur.

During forward turning, as shown in FIG. 3A, the engaging elements 17 of the two-way clutch 11 are in a non-engaged state with the cam surfaces 14 of the inner ring 13 for transmitting the driving torque to the rear wheels 4 and the cylindrical inner surface 16 of the outer ring 15 for transmitting the driving torque to the front wheels 6. Thus, the moment the R range is selected, it is determined that it is reverse operation, and as shown in FIG. 3B, the engaging elements 17 will be brought into engagement with the cam surfaces 14 and the cylindrical inner surface 16.

Since during turning the front wheels 6 are rotating faster than the rear wheels 4, the outer ring 15 of the two-way clutch 11 is turning faster than the inner ring 13. Even after it has been returned to the D range, since the rear wheels 4 never rotate faster than the front wheels 6, the engaging elements 17 of the two-way clutch 11 will be kept in an engaged state as shown in FIG. 3C. Since they are in engagement, the front wheels 6 and the rear wheels 4 tend to rotate at the same revolving speed. But during turning on a high-$\mu$ road, the front wheels 6 have to rotate faster than the rear wheels 4, so that tight corner braking occurs.

The automatic transmission of an AT vehicle generally comprises a torque converter and an auxiliary transmission. To change over ranges, using hydraulic pressure, a wet type clutch arranged in a transmission portion of the auxiliary transmission, a brake and a one-way clutch are actuated one after another. Thus, there exists a time delay t1 from the changeover of range until drive in the selected range is actually transmitted to the vehicle body. This time delay t1 is longer than an engagement delay time t2 from the energization of the electromagnetic coil 12 of the rotation transmission device 10 to the engagement of the two-way clutch 11. Thus it is not necessary to actuate the rotation transmission device 10 until the time t3 obtained by subtracting the engagement delay time of the rotation transmission device 10 from the time delay of the transmission mechanism after it has been changed over to a range in a reverse direction, i.e. t3=t2−t1. That is, even if the engagement is delayed by the time t3, the rotation speed difference will not increase, so that there will be no engagement shock. Further, even if there exists a rotation speed difference of about 100 rpm, it is possible to engage without shock. Thus it is possible to further delay until time t4=t3+α until a rotation speed difference reaches about 100 rpm. Thus, if after the driver has changed over to the reverse range the range is returned to the original range in the traveling direction during time delay t4, it is possible to prevent tight corner braking.

That is, in Embodiment 1, the engagement delay time is set at a time when after a range in the reverse direction is entered, if this state has been kept for a predetermined time t4, or if the deceleration of the number of revolutions of the rear wheels produced due to reverse travel operation has exceeded a predetermined value, the electromagnetic coil 12 of the rotation transmission device 10 is energized.

With this arrangement, it is possible to prevent tight corner braking which could occur if, during turning on a high-$\mu$ road, reverse range is selected only momentarily and the range is returned to the travel direction.

Embodiment 3

On a steep slope in which it is impossible to climb with AT creeping, if a range for driving in the climbing direction is selected during stop and the brakes are released, the vehicle will go down in the descending direction. Since the friction coefficient between the rear wheels 4 and the road surface is high on a high-$\mu$ road, the rear wheels will rotate in the descending direction. The same is true for the front wheels 6, too.

Figure 4A:
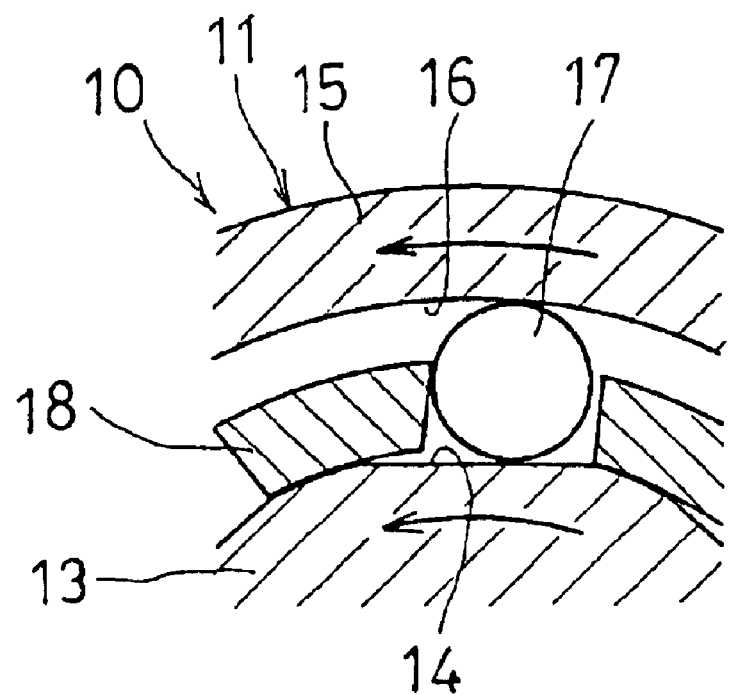
FIGS. 4A and 4B are sectional views showing how the two-way clutch is disengaged.
Figure 4B:
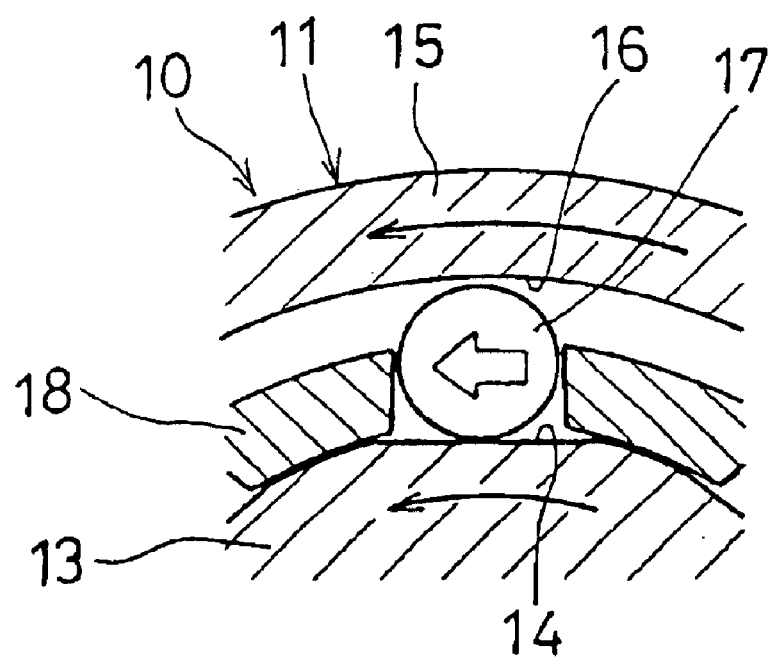

In such a case, on a high-$\mu$ road, since the driving direction of the range and the direction in which the vehicle moves are different, in the control of Embodiment 1, as shown in FIG. 3B, the two-way clutch 11 is engaged. Since this engagement is in the direction in which the front wheels 6 drive the rear wheels 4, during turning, tight corner braking would occur. If the vehicle is started by stepping the accelerator, since the rotational direction of the front and rear wheels 4 and 6 changes over, the rotational direction of the inner ring 13 and the outer ring 15 of the two-way clutch 11 also changes over as shown in FIG. 4A. Since this is the direction in which the inner ring 13 drives the outer ring 15, the engaging elements 17 are in a disengaged state as shown in FIG. 4B, so that no tight corner braking occurs.

But if while the vehicle is going down a slope with the range in the ascending direction, it is changed over to the range for driving in the descending direction to travel in the descending direction, though it is a very rare case, since the front wheels 6 are in engagement in such a direction as to drive the rear wheels 4, tight corner braking will occur during turning.

If the method of detecting deceleration of the rear wheels 4 is used as in Embodiment 2, since deceleration of the rear wheels produced during reverse travel is used, such a tight corner braking will not occur. But if engagement is done a given time after range in the reverse direction has been selected, tight corner braking will occur.

If judgment is done taking only deceleration in consideration, if sharp reverse travel accompanying changeover of ranges is done while considerably depressing the accelerator on a low-$\mu$ road, when the two-way clutch 11 of the rotation transmission device 10 is engaged, the rotation speed difference between the front and rear wheels 4 and 6 may increase so much that engagement shock can occur.

Figure 5:
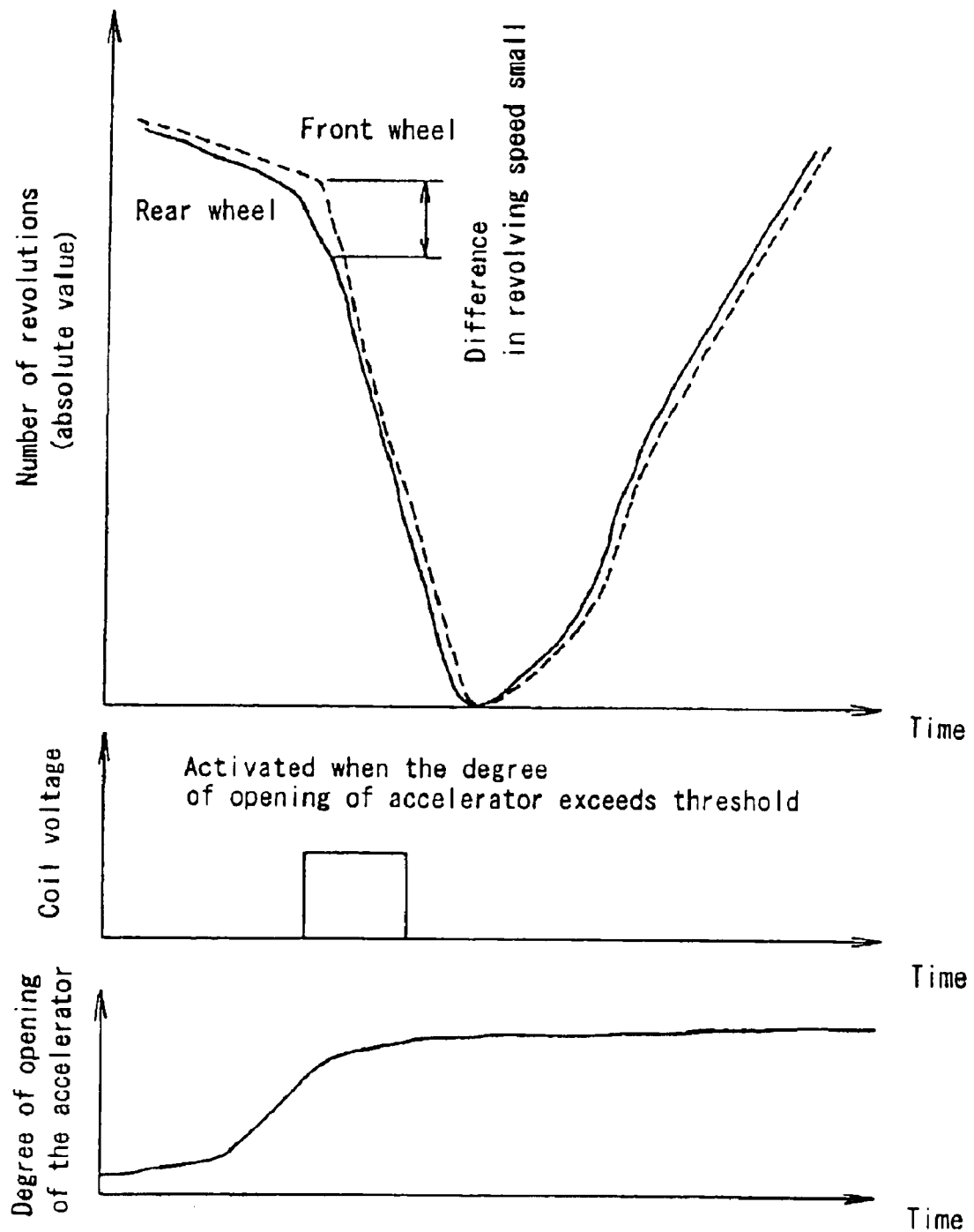
FIG. 5 is a graph showing the relation between the numbers of revolutions of the front and rear wheels, the coil voltage and the degree of opening of the accelerator when the vehicle is moved in a reverse direction while depressing the accelerator.
Figure 6:
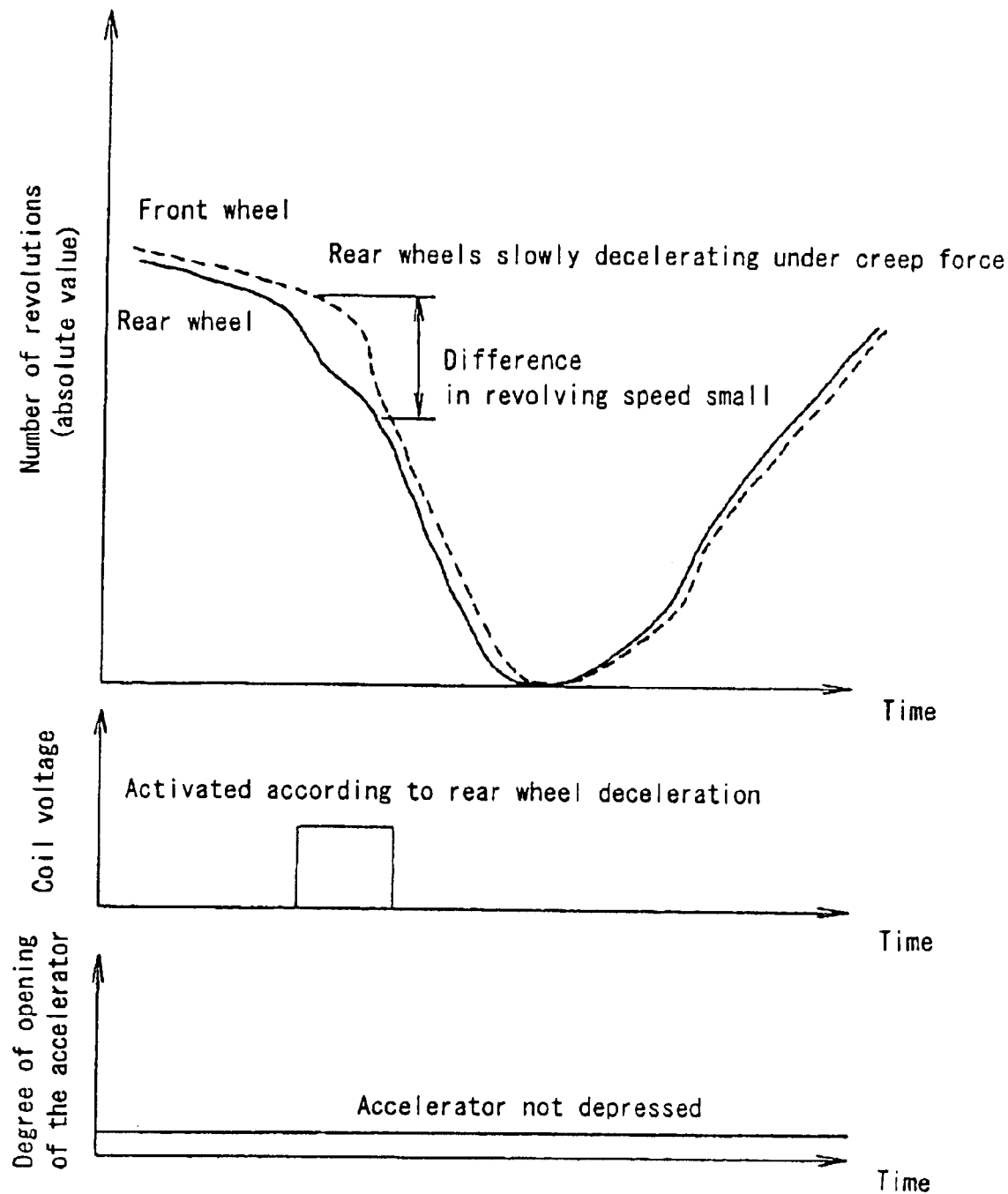
FIG. 6 is a similar graph when the vehicle is moved in a reverse direction only with the creeping force without depressing the accelerator.

During such a reverse travel, since the accelerator is depressed, as shown in FIG. 5, the condition that when the accelerator is depressed, the two-way clutch 11 of the rotation transmission device 10 is engaged is added to Embodiment 1. On the other hand, in reverse travel with only the creeping force while not depressing the accelerator on a not-so-steep slope where the creeping force effectively works or on a level road, change in the number of revolutions of the rear wheels is moderate as shown in FIG. 6. Thus it is possible to engage the two-way clutch 11 of the rotation transmission device 10 only with the deceleration condition before the rotation difference increases.

Embodiment 4

A control method will be described below for such a case in which the traveling direction of the vehicle is not detectable because the rotational direction of the rear wheels 4 or front wheels 6 cannot be detected. In this case, the rotational direction is inferred from the speed in each range.

As for the kinds of ranges, D-range, N-range and R-range are used.

The conditions necessary for judgment of reverse travel based on the combination of the range and the speed are shown in Table 1. Conditions for judging reverse travel by combining these factors are as follows:

Condition for judgment of reverse travel=(condition 1) or ((condition 2 or condition 3) and condition 4)

It will be described below why reverse travel can be judged under these conditions.

TABLE 1

| No. | Condition | Situation |
| --- | --- | --- |
| 1 | Range before change to N-range is different from the range after change from N-range and the rear wheel speed in N-range has not dropped below several km/h. | e.g. changed to R-range while traveling in D-range. |
| 2 | Range before change to N-range is the same as the range after change from N- | e.g. while ascending a slope in D-range, changed to N-range, and after starting |

TABLE 1-continued

| No. | Condition | Situation |
|---|---|---|
| | range and the rear wheel speed in N-range has dropped below several km/h. | descending, changed to D-range. |
| 3 | Vehicle speed is below several km/h when changed to N-range from range before changed to N-range. | e.g. while ascending a slope, stops the vehicle and changes to N-range, and while descending backward, changes to D-range to ascend the slope again. |
| 4 | After change of the range, vehicle speed decreases at predetermined deceleration. | After range change, torque in reverse direction does not act immediately due to delay of hydraulic circuit of transmission. Therefore sometimes the range is returned before torque acts. In this case the rotation transmission mechanism is engaged after deceleration of rear wheels occurs to avoid tight corner braking. |
| 5 | The range before change to N-range used in conditions 1–3 is the range before change to N-range in which vehicle speed was below several km/h if speed below several km/h was not passed in range before change to N-range. | Sometime after change from D-range to R-range, vehicle moves forward and then goes backward. Thus, if operated D-N-R-N, if changed to R-range only instantaneously, R-range does not act effectively, but vehicle goes ahead even in R-range. If R-range acts effectively so that vehicle travels backward, speed zero is passed in R-range because rotational direction changes. If sped zero is not passed, R-range was judged ineffective, so that range is judged D-N. |

Figure 7:
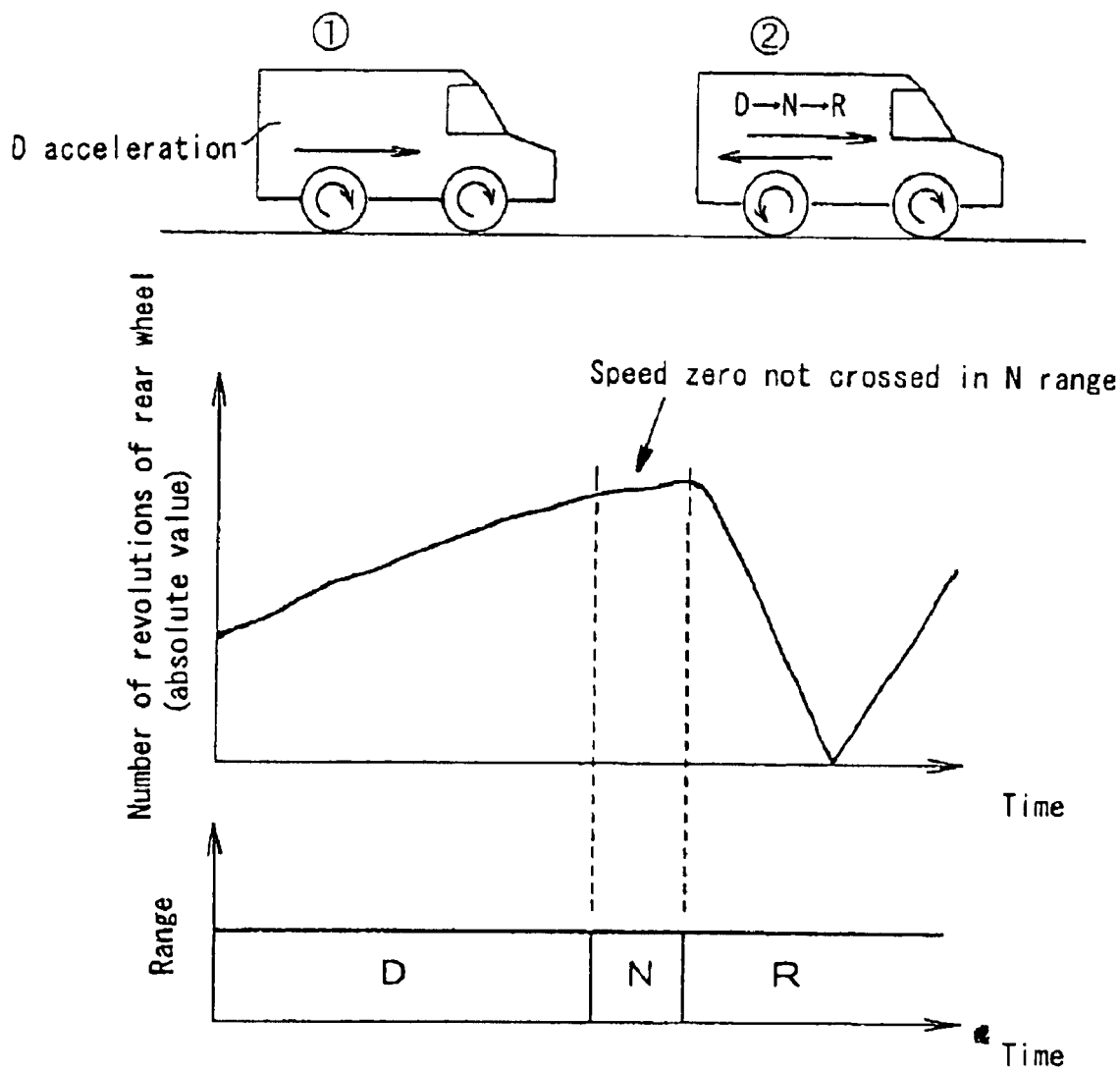
FIG. 7 is an explanatory view of a reverse travel operation judged under condition 1.

The condition 1 shown in Table 1 is the case in which when the range is changed over from the D-range to R-range or from the R-range to D-range as shown in FIG. 7, and the speed in the N-range which is passed during such a changeover has not dropped below several km/h. Reverse operation is to change over to the range for driving in the opposite direction while travelling in the driving direction of the range. But if the travel direction of the vehicle is reversed in the N-range during such a changeover, it is not reverse operation. When the travel direction is reversed, the speed of the vehicle passes 0 km/h. Thus, a condition that the speed during N-range does not drop to below several km/h is added. Instead of several km/h, the use of 0 km/h is actually desired. But this is not possible because rotation sensors of a passive type cannot detect zero speed and speed zero is produced only for a short time in a rapid speed change, so that even rotation sensors of an active type may be unable to detect zero speed.

Driving in which speed 0 km/h is passed during N-range is the case in which while the vehicle is climbing a slope in D-range, the range is changed over to N-range, so that the vehicle descends by its own weight, and after the vehicle has moved in the backward direction, it is changed over to R-range. Naturally, such a driving is not reverse travel.

Figure 8:
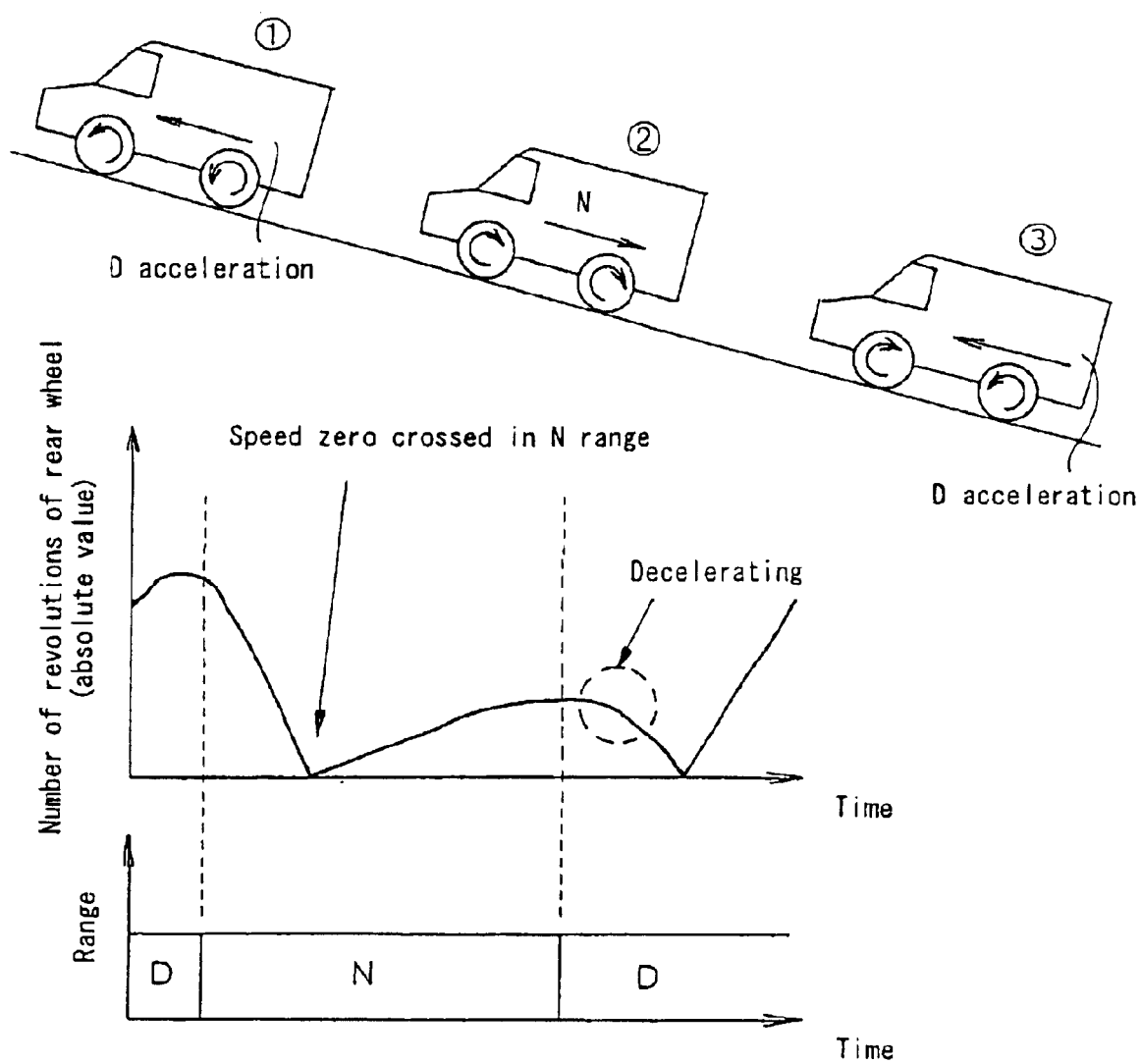
FIG. 8 is an explanatory view of a reverse travel operation judged under conditions 2 and 4.

Next, the condition 2 shown in Table 1 is a case in which there is a possibility of reverse travel. In this case, using the condition 4, reverse travel is judged. In the condition 2, let us assume that for example, as shown in FIG. 8, while the vehicle is climbing a slope in D-range, it is changed over to N-range, so that the travel direction of the vehicle has been reversed in a descending direction. If it is changed over to D-range while traveling in the descending direction, it is a reverse drive. If it is changed over to R-range, it is not a reverse drive. In the case of driving in D-range N-range D-range, the driving ranges before and after changeover to N-range are the same, and during N-range, the rotational direction of the rear wheels is reversed, so that speed zero is passed. As in the condition 1, since it is actually impossible to use speed zero, the speed condition is set to several km/h or under. For example, if the vehicle climbs a slope in D-range and the mode is changed over to N-range and then is changed over back to D-range immediately before the travel direction of the vehicle is reversed in a descending direction, the speed will be below several km/h because it is immediately before the direction is reversed, so that condition 2 is met. Since it is not a reverse driving in this case, it is necessary to judge by the deceleration of the rear wheels which occurs during reverse travel, under condition 4. In such a driving, since the speed is below several km/h, predetermined deceleration necessary for judgment of reverse travel will not be produced, so that there will be no error in judgment of reverse travel.

Figure 9:
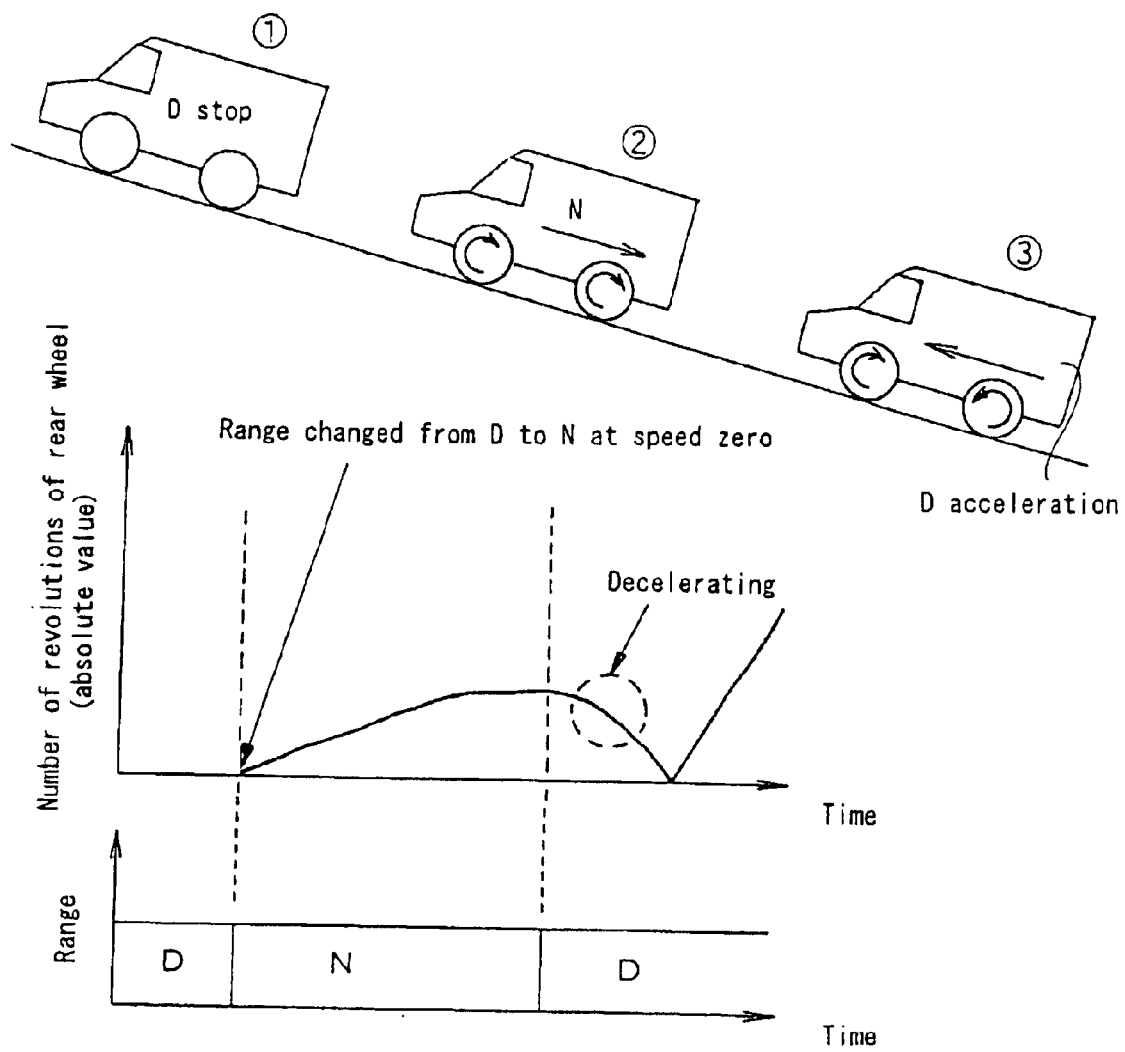
FIG. 9 is an explanatory view of a reverse travel operation judged under conditions 3 and 4.

Condition 3 shown in Table 1, too, is a case in which reverse travel can happen. In this case, too, as in condition 2, reverse travel is judged by adding condition 4. Condition 3 is, as shown in FIG. 9, the case in which during stop on a slope, the range is changed over from D-range or R-range to N-range to descend the slope by its own gravity, and reverse driving is carried out by changing over to D-range or R-range for driving in the climbing direction. In this case, since it is during stop, the speed when it is changed over to N-range is zero. If travel during N-range is the forward-moving direction, it is a reverse driving if it is changed over to R-range and it is not a reverse driving if it is changed over to D-range. If travel in N-range is in the backward direction, it is a reverse driving if it is changed over to D-range and not a reverse driving if it is changed over to R-range. Thus, since it is impossible to judge whether or not it is reverse travel only with condition 3, it is necessary to judge by deceleration of the rear wheel generated during reverse travel. In order to judge by the deceleration, condition 4 is added.

Further, in conditions 1–3, although it should intrinsically be detection of speed zero, it is set at several km/h. In each condition, if the condition of speed zero is changed to several km/h, the condition is relaxed. If it is checked whether or not there is any error in judgment, the results as shown in Table 2 will be obtained. It is not determined to be reverse travel in condition 1. But since the vehicle speed is small, in view of the difference in the revolving number or change in the revolving number of the front and rear wheels, no shock will be produced. In conditions 2 and 3, since such a driving is actually impossible, no tight braking will occur.

Thus, it is possible to carry out reverse travel judgment during actual driving even in Embodiment 3. Thus, it is possible to reduce the deceleration in condition 4, and thus to instantaneously engage the rotation transmission device 10.

TABLE 2

| No. | Conditions in which misjudgement occurs | Examples of misjudgement |
| --- | --- | --- |
| 1 | Start range differs from end range and rear wheel speed does not pass several km/h in N-range. | If while vehicle speed is decreasing in D-range, when speed has descrased below several km/h, changed to N-range and to R-range, not judged as reverse travel. |
| 2 | Start range is the same as end range and rear wheel speed passes several km/h in N-range. | From near-stop state, changes to D-range and accelerate, and changes to N-range before speed exceeds several km/h. Then descends a slope under own weight and changes again to D-range. In speed down due to engine brake, if turns on high-$\mu$ road, tight corner braking occurs. |
| 3 | When changed from start range to N-range, vehicle speed was several km/h. | From near-stop state, changes to D-range and accelerate, and changes to N-range before speed exceeds several km/h. Then descends a slope under own weight and changes again to D-range. In speed down due to engine brake, if turns on high-$\mu$ road, tight corner braking occurs. |

Embodiment 5

On a steep slope which cannot be climbed with AT creeping, if during stop, the range for driving in the climbing direction is entered and the brakes are released, the vehicle will descend in the descending direction. On a high-$\mu$ road, since the friction coefficient between the rear wheels and the road surface is high, the rear wheels 4 rotate in the descending direction. The same is true for the front wheels 6, too.

While this is an extremely rare driving, on a high-$\mu$ steep slope, if it is changed over to the range in the climbing direction and while accelerating in the descending direction by its own weight, the range in the descending direction is entered, condition 1 in Table 1 is met, so that the two-way clutch 11 of the rotation transmission device 10 engages. Thus, during turning, tight corner braking occurs. Such a driving tends to occur on a vehicle which is weak in the creep force because the engine torque is small.

In order to prevent a tight corner braking in such an extremely rare driving, the reverse travel judgment condition is set as follows:

reverse travel judgment=(condition 1 or condition 2 or condition 3) and condition 4 by adding condition 4 in condition 1. A driving in which the rotation difference between the front wheels and the rear wheels widens in the shortest time during reverse driving is a driving in condition 1 in which the vehicle speed before reverse travel is fast. But with a vehicle that is small in the engine torque and weak in the creeping force, since the time during which the rotation difference increases is long even in a driving of condition 1, even if condition 4 is added, it is possible to engage without shock.

Embodiment 6

In Embodiment 4, it is a prerequisite that the driving direction of the range is coincident with the traveling direction of the vehicle during D (D, 2, L) range or R-range. But it is necessary to consider a case in which they do not coincide. They do not coincide in a case in which ranges are changed over instantaneously. An automatic transmission of an AT vehicle generally comprises a torque converter and an auxiliary transmission. For changeover of ranges, using hydraulic pressure, a wet type clutch, brake and one-way clutch arranged in the transmission mechanism of the auxiliary transmission are actuated one after another. Thus, there exists some time delay between the changeover of ranges and the time when the drive in the range is actually transmitted to the vehicle body.

For example, though it is an extremely rare driving, it is the case in which while traveling in D-range, R-range is instantaneously entered and before the drive of R-range is transmitted to the rear wheels, which are drive wheels, the range is returned to D-range. In this case, when it is returned to D-range, since the range immediately before N-range is R-range, in N-range, which is between R-range and D-range, speed zero is not passed. Thus, condition 1 of Table 1 is met, and in spite of no reverse driving, the two-way clutch 11 of the rotation transmission device 10 engages. Thus, if such a driving is carried out during turning on a high-$\mu$ road, tight corner braking will occur.

In an actual reverse travel, when changeover is made from R-range to D-range, speed decrease of the rear wheels occur. Thus, as in Embodiment 5, as in conditions 2 and 3, if judgment condition about speed decrease of the rear wheels, which is condition 4, is added to condition 1, no tight corner braking will occur even if such a driving is carried out.

By adding condition 5 to condition 1 too, it is possible to prevent occurrence of tight corner braking during actual operation. In actual operation, if R-range is maintained not instantaneously but until driven, a reverse travel state begins in R-range. At this time, in R-range, in since the rotational direction changes, speed zero is passed. And as in actual operation, if R-range is entered only instantaneously, since the rotational direction does not change, speed zero is not passed. Thus, even if changeover is made from R-range to D-range and speed zero is not passed in N-range, so that condition 1 is satisfied, if speed zero is not passed during R-range, this R-range can be determined invalid. Due to this judgment, the range changeover becomes D-range N-range D-range, so that speed zero is not detected in N-range. Thus condition 1 is not met. Thus, the two-way clutch 11 of the rotation transmission device 10 is not engaged.

There is a case in which condition 1 is not met in spite of reverse driving because of addition of condition 5. This is a case in which during stop on a slope, it is changed over to N-range to descend by its own weight, then changed over to R-range to continue descending travel and then the vehicle travels in reverse in D-range. In this case, since speed zero is not passed in R-range, due to condition 5, the R-range is judged invalid, so that condition 1 is not met. But in this case, since condition 3 is met when N-range is entered during stop on a slope, it is possible to engage the two-way clutch 11 of the rotation transmission device 10.

Embodiment 7

In view of the facts that the rotation speed difference in which the two-way clutch 11 of the rotation transmission device 10 can engage without shock is several hundred rpm and that there is a time delay of several tens milliseconds to one hundred and several tens milliseconds from the energization of the electromagnetic coil 12 until it engages, the predetermined deceleration used in Embodiments 2 and 4 to judge reverse travel has to be at least several hundreds rpm/0.1 sec or over. Thus the predetermined deceleration is set to from about 50 rpm/0.1 sec to 200 rpm/0.1 sec. If acceleration/deceleration is calculated every 0.1 second, in the worst case, since from the occurrence of deceleration due to reverse travel, a further delay of 0.1 second results at the most, calculation of acceleration/deceleration is preferably done every 1/10 or less of the engagement time. If calculation of acceleration/deceleration is carried out every 10 ms, the difference in the number of revolutions of the rear wheels, which is calculated by subtracting the number of revolutions of the rear wheels 10 ms before from the number of revolutions of the rear wheels, i.e. the deceleration is from 5 rpm/0.01 sec to 20 rpm/0.01 sec. If it is calculated from the number of revolutions of the rear wheels 50 ms before in order to cancel variation in rotation, the predetermined acceleration/deceleration will be from 25 rpm/0.05 sec to 100 rpm/0.05 sec.

The control of an FR-based four-wheel drive vehicle of an AT type is as described above. Next, a control method of an FR-based four-wheel drive vehicle with a manual transmission (MT) will be described.

The structure of an FR-based four-wheel drive vehicle of an MT type is the same as the four-wheel drive vehicle of the AT vehicle shown in FIG. 1. Thus the following description will be made with reference to the four-wheel drive vehicle shown in FIG. 1.

Generally, with an FR-based four-wheel drive vehicle of an MT type provided with a rotation transmission device 10 as shown in FIG. 11, if reverse travel driving in which a gear in the opposite direction to the travelling direction is entered during traveling, is carried out, the rear wheels will rotate in the reverse direction without engine stop on a low-$\mu$ road. At this time, if the rotation transmission device is engaged, both front and rear wheels will rotate in a reverse direction, so that it is possible to continue travel.

In the control in which using the rotation transmission device 10, two-wheel drive and four-wheel drive are automatically changed over according to the traveling state, if reverse travel of the vehicle is judged only with the difference in the numbers of revolutions of the front and rear wheels detected or change in the number of revolutions, the threshold has to be large. Thus, when the two-way clutch 11 of the rotation transmission device 10 is engaged, engagement shock is accompanied.

Therefore, in this embodiment, judgment of reverse travel of the vehicle is made under the following conditions:

① If a gear for driving in the reverse direction is entered into with respect to the traveling direction of the vehicle, which is judged by the rotational direction detected by rotation sensors.

② When the accelerator is depressed.

If the accelerator is not depressed, engine stop will occur during reverse travel, so that it is impossible to continue travel.

Detection of a gear will be enough if it is possible to detect whether it is forward or backward travel direction. For example, for the backward travel direction, there is only one reverse gear and a detector is provided in every car to turn on a back light. Thus, it is determined to be travelling backward when the back light is on, and otherwise it is determined to be traveling forward.

For the detection about the accelerator, the accelerator opening voltage is used. When the accelerator is depressed, the degree of opening of the accelerator increases. But the rear wheels 4, which are the drive wheels, are actuated with a time lag relative to the change in the degree of opening of the accelerator.

Thus, during reverse travel, it is possible to engage the two-way clutch 11 of the rotation transmission device 10 before the difference in rotation between the front wheels 6 and the rear wheels 4 widens, so that it is possible to prevent engaging shock.

Figure 10:
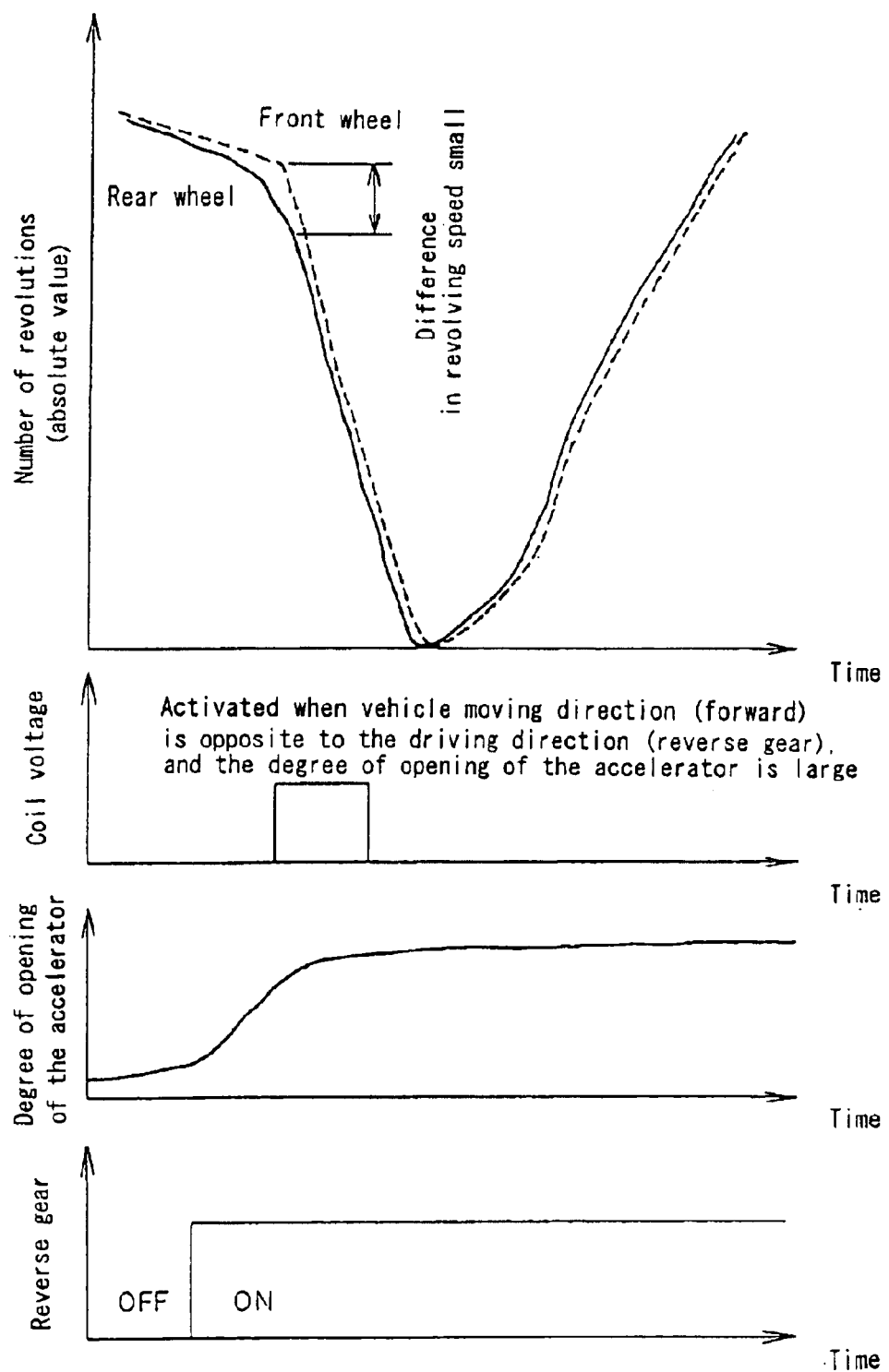
FIG. 10 is a graph showing the relation between the coil voltage and the numbers of revolutions of the front and rear wheels when reverse travel is carried out with the gear of a four-wheel drive vehicle of an MT type put in the reverse gear and with the accelerator depressed.

FIG. 10 shows a control movement of the two-way clutch 11 if the reverse gear is entered during forward travel of the vehicle and the vehicle travels in reverse. If the reverse gear is turned on and the degree of opening of the accelerator exceeds the value during idling, the electromagnetic coil 12 is energized to bring the two-way clutch 11 into an engaged state. Since the difference in the number of revolutions between the front wheels 6 and the rear wheels 4 is small in the engaged state, that is, the difference in the number of revolutions between the outer ring 15 and the inner ring 13 of the two-way clutch 11 is small, no engagement shock will occur.

As described above, according to this invention, in either of an AT or MT vehicle, on a low-$\mu$ road, reverse travel without engagement shock is possible.

What is claimed is:

1. A method of controlling a four-wheel drive vehicle, the vehicle including an engine, an automatic transmission connected to the engine which is changeable between a forward travel position and a backward travel position, and front wheels and rear wheels, the rear wheels being directly connected to the automatic transmission, the front wheels being connected to the automatic transmission through a rotation transmission device, the rotation transmission device comprising a two-way clutch and an electromagnetic coil, the two-way clutch being adapted to engage when the electromagnetic coil is energized, thereby transmitting engine torque to the front wheels, and being adapted to disengage when the electromagnetic coil is not energized, thereby uncoupling the front wheels from the engine, said method comprising:

detecting a traveling direction of the vehicle based on signals from a rotation sensor that picks up the rotational direction of a propeller shaft for the front wheels or for the rear wheels or the rotational direction of at least one of the front and rear wheels;

detecting the travel position of the automatic transmission;

comparing the traveling direction of the vehicle with the travel position of the automatic transmission; and energizing the electromagnetic coil to engage the two-way clutch if the vehicle is traveling forward while the automatic transmission is in the backward travel position or if the vehicle is traveling backward while the automatic transmission is in the forward travel position.

2. The method of claim 1, wherein said energizing is further dependent upon at least one of the following three conditions being met:

if the rear wheels decelerate at or over a predetermined deceleration, if a time equal to or less than a preset time has passed after the travel position of the automatic transmission has been changed, and if the degree of opening of the accelerator of the vehicle exceeds the opening value during idling, so that, if the vehicle is traveling forward while the automatic transmission is in the backward travel position or if the vehicle is traveling backward while the automatic transmission is in the forward travel position, and if one of the three conditions is met, the electromagnetic coil is energized to engage the two-way clutch.

3. The method of claim 2, wherein the predetermined deceleration of the rear wheels is from 5 rpm/0.01 sec. to 20 rpm/0.01 sec.

4. A method of controlling a four-wheel drive vehicle, the vehicle including an engine, an automatic transmission connected to the engine which is changeable between a forward travel position, a backward travel position and a neutral position, and front wheels and rear wheels, the rear wheels being directly connected to the automatic transmission, the front wheels being connected to the automatic transmission through a rotation transmission device, the rotation transmission device comprising a two-way clutch and an electromagnetic coil, the two-way clutch being adapted to engage when the electromagnetic coil is energized, thereby transmitting engine torque to the front wheels, and being adapted to disengage when the electromagnetic coil is not energized, thereby uncoupling the front wheels from the engine, said method comprising:

detecting a traveling speed of the vehicle;

detecting the travel position of the automatic transmission; and energizing the electromagnetic coil to engage the two-way clutch if the travel position of the automatic transmission has changed from the forward travel position to the neutral position and then to the backward travel position, or from the backward travel position to the neutral position and then to the forward travel position, and if the traveling speed of the vehicle while the automatic transmission is in the neutral position is higher than a predetermined value.

5. The method of claim 4, wherein said energizing is further dependent upon a condition of the rear wheels decelerating over a predetermined deceleration within a predetermined time after the travel position of the automatic transmission has been changed from the neutral position, so that, if the travel position of the automatic transmission has changed from the forward travel position to the neutral position and then to the backward travel position, or from the backward travel position to the neutral position and then to the forward travel position, wherein the rear wheels decelerate over the predetermined deceleration within the predetermined time after the travel position of the automatic transmission has been changed from the neutral position, and if the traveling speed of the vehicle while the automatic transmission is in the neutral position is higher than the predetermined value, the electromagnetic coils is energized to engage the two-way clutch.

6. The method of claim 5, wherein the predetermined deceleration of the rear wheels is from 5 rpm/0.01 sec. to 20 rpm/0.01 sec.

7. A method of controlling a four-wheel drive vehicle, the vehicle including an engine, an automatic transmission connected to the engine which is changeable between a forward travel position, a backward travel position and a neutral position, and front wheel and rear wheels, the rear wheels being directly connected to the automatic transmission, the front wheels being connected to the automatic transmission through a rotation transmission device, the rotation transmission device comprising a two-way clutch and an electromagnetic coil, the two-way clutch being adapted to engage when the electromagnetic coil is energized, thereby transmitting engine torque to the front wheels, and being adapted to disengage when the electromagnetic coil is not energized, thereby uncoupling the front wheels from the engine, said method comprising:

detecting a traveling speed of the vehicle;

detecting the travel position of the automatic transmission; and energizing the electromagnetic coil to engage the two-way clutch if the following three conditions are all met:

the travel position of the automatic transmission has changed from the forward travel position to the neutral position and then to the forward travel position, or from the backward travel position to the neutral position and then to the backward travel position;

the traveling speed of the vehicle has dropped below a predetermined value at least once while the travel position is in the neutral position, or the traveling speed of the vehicle is below the predetermined value when the travel position has been changed to the neutral position from the forward travel position or from the backward travel position; and deceleration of the rear wheels has exceeded a predetermined value with several seconds after the travel position of the automatic transmission has changed from the neutral position to the forward travel position or backward travel position.

8. The method of claim 7, wherein the predetermined value of deceleration of the rear wheels is from 5 rpm/0.01 sec. to 20 rpm/0.01 sec.

9. A method of controlling a four-wheel drive vehicle, the vehicle including an engine, a manual transmission connected to the engine which is changeable between a forward travel position and a backward travel position, and front wheels and rear wheels, the rear wheels being directly connected to the manual transmission, the front wheels being connected to the manual transmission through a rotation transmission device, the rotation transmission device comprising a two-way clutch and an electromagnetic coil, the two-way clutch being adapted to engage when the electromagnetic coil is energized, thereby transmitting engine torque to the front wheels, and being adapted to disengage when the electromagnetic coil is not energized, thereby uncoupling the front wheels from the engine, said method comprising:

detecting a traveling direction of the vehicle based on signals from a rotation sensor that picks up the rotational direction of a propeller shaft for the front wheels or for the rear wheels or the rotational direction of at least one of the front and rear wheels;

detecting the travel position of the manual transmission;

comparing the traveling direction of the vehicle with the travel position of the manual transmission; and energizing the electromagnetic coil to engage the two-way clutch if the following two conditions are both met:

the vehicle is traveling forward while the manual transmission is in the backward travel position or the vehicle is traveling backward while the manual transmission is in the forward travel position, and the degree of opening of an accelerator of the vehicle is higher than the degree of opening of the accelerator while the engine is at idle.

* * * * *